(12) United States Patent
Ueda et al.

(10) Patent No.: US 8,504,242 B2
(45) Date of Patent: Aug. 6, 2013

(54) MOTOR CONTROLLER AND ELECTRONIC POWER STEERING APPARATUS

(75) Inventors: Takeshi Ueda, Kashiba (JP); Shigeki Nagase, Nabari (JP); Kouya Yoshida, Toyota (JP)

(73) Assignee: JTEKT Corporation, Osaka-shi (JP)

( * ) Notice: Subject to any disclaimer, the term of this patent is extended or adjusted under 35 U.S.C. 154(b) by 373 days.

(21) Appl. No.: 12/935,784

(22) PCT Filed: Mar. 30, 2009

(86) PCT No.: PCT/JP2009/056489
§ 371 (c)(1),
(2), (4) Date: Sep. 30, 2010

(87) PCT Pub. No.: WO2009/123107
PCT Pub. Date: Oct. 8, 2009

(65) Prior Publication Data
US 2011/0022271 A1 Jan. 27, 2011

(30) Foreign Application Priority Data
Mar. 31, 2008 (JP) ................................. 2008-093454

(51) Int. Cl.
H02P 21/14 (2006.01)
(52) U.S. Cl.
USPC ........................................................ 701/41
(58) Field of Classification Search
USPC ........................................................ 701/41
See application file for complete search history.

(56) References Cited

U.S. PATENT DOCUMENTS

| 6,016,042 A | 1/2000 | Miura et al. |
| 2008/0191655 A1 | 8/2008 | Ueda et al. |

(Continued)

FOREIGN PATENT DOCUMENTS

| JP | 9 331693 | 12/1997 |
| JP | 2001 103799 | 4/2001 |

(Continued)

OTHER PUBLICATIONS

Ogata, Katsuhiko, "Modern Control Engineering", 2002, Prentice Hall, 4th, p. 6-7.*

(Continued)

*Primary Examiner* — Thomas Tarcza
*Assistant Examiner* — Maceeh Anwari
(74) *Attorney, Agent, or Firm* — Oblon, Spivak, McClelland, Maier & Neustadt, L.L.P.

(57) ABSTRACT

An angle calculator detects a rotation angle θa of a rotor. A three-phase/d-q axis converter outputs detected current id, iq on d-q coordinate axes by making a conversion, based on a corrected detection angle θc obtained by adding or subtracting an amount of detection deviation from a time point of current detection to or from the detection angle θa. A command current calculator calculates command current id*, iq* on the d-q coordinate axes based on a steering torque T and a speed S. A feedback controller calculates command voltages vd, vq on the d-q coordinate axes based on the command current id*, iq* and the detected current id, iq. A d-q axis/three-phase converter converts the command voltages vd, vq into three-phase command voltages, based on a corrected detection angle θb obtained by adding an amount of detection deviation from a time point when a motor is driven to the detection angle θa. The deviation can be eliminated by the command voltages, and the motor can be driven with high precision.

6 Claims, 3 Drawing Sheets

U.S. PATENT DOCUMENTS

| | | | |
|---|---|---|---|
| 2010/0280714 | A1 | 11/2010 | Ueda et al. |
| 2011/0022271 | A1 | 1/2011 | Ueda et al. |

FOREIGN PATENT DOCUMENTS

| | | | |
|---|---|---|---|
| JP | 2001103799 | * | 4/2001 |
| JP | 2004 336913 | | 11/2004 |
| JP | 2006 56473 | | 3/2006 |
| JP | 2007 118823 | | 5/2007 |
| JP | 2008 37399 | | 2/2008 |

OTHER PUBLICATIONS

U.S. Appl. No. 12/812,678, filed Jul. 13, 2010, Ueda et al.
U.S. Appl. No. 12/935,816, filed Sep. 30, 2010, Ueda et al.
Chinese Office Action issued Jan. 18, 2013 in Patent Application No. 200980111532.X with English Translation.
Office Action issued Jul. 20, 2012 in Chinese Patent Application No. 200980111532.X (with English-language translation).
International Search Report issued Jun. 23, 2009 in PCT/JP09/56489 filed Mar. 30, 2009.
U.S. Appl. No. 12/935,784, filed Sep. 30, 2010.
U.S. Appl. No. 13/727,263, filed Dec. 26, 2012, Ueda, et al.

* cited by examiner

MOTOR CONTROLLER AND ELECTRONIC POWER STEERING APPARATUS

TECHNICAL FIELD

The present invention relates to a motor controller and an electronic power steering apparatus equipped with the motor controller.

BACKGROUND ART

In the prior art, the electronic power steering apparatus for applying the steering assist force to the steering mechanism of the vehicle by driving the electronic motor in response to the steering torque that the driver applies to the steering wheel (handle) is employed. As the electronic motor of the electronic power steering apparatus, the brush motor is employed widely in the prior art. From the aspects of an improvement in reliability and durability, a reduction in inertia, etc., the brushless motor is also employed nowadays.

In order to control a torque produced by the motor, commonly the motor controller detects an electric current flowing through the motor, and then applies the PI control (proportional integral control) based on a difference between an electric current that is to be supplied to the motor and an electric current that is detected. This motor is the three-phase brushless motor, for example. In order to detect the electric current in two phases or more, two or three current sensors are provided to the motor controller. Also, since a rotation angle of the motor is employed in the d-q axis/three-phase convention, various operations, etc., whose details are described later, the sensor such as the resolver, the Hall IC, or the like is provided to sense the rotation angle of the motor.

In connection with the invention of this application, in JP-A-9-331693 and JP-A-2006-56473, the configuration for estimating a rotation angle of the motor not to use the rotation angle sensor or the angular velocity sensor for the motor is disclosed. Also, in JP-A-2007-118823 and JP-A-2008-37399, the configuration for estimating a rotation angle of the motor when a failure is caused in the motor rotation angle detecting section is disclosed.

DISCLOSURE OF THE INVENTION

Problems that the Invention is to Solve

As described above, in the motor controller in the prior art, in many cases the motor rotation angle detecting section is provided. In this event, only when such motor rotation angle detecting section is not provided (or only when such motor rotation angle detecting section is broken down), the section for estimating the rotation angle of the motor may be provided.

However, an angle that is sensed by the motor rotation angle detecting section varies every moment. Therefore, even though the motor rotation angle detecting section is provided, it is possible to say that the detection angle does not always indicate a correct angle at the time of controlling the motor. This is because a delay due to a calculating time, variation of detecting timing, variation of control timing, or the like is caused. As a result, depending on the angle that is sensed by the motor rotation angle detecting section, the motor control cannot be made with good precision.

Therefore, it is an object of the present invention to provide a motor controller and an electronic power steering apparatus equipped with the same, capable of applying a motor control with good precision based on a detected result of a rotation angle of a motor.

Means for Solving the Problems

A first invention provides a motor controller for driving a brushless motor, that includes an angle detecting section that detects a rotation angle of a rotor of the brushless motor; a drive controlling section that calculates command values indicating levels of command voltages for driving the brushless motor; and a motor driving section that drives the brushless motor by using the voltages at the levels indicated by the command values calculated by the drive controlling section, wherein the drive controlling section calculates the command value, based on a corrected detection angle obtained by adding or subtracting an amount of detection deviation, that corresponds to a time difference from a time point of angle detection by the angle detecting section, to or from an angle detected by the angle detecting section.

In a second invention according to the first invention, the drive controlling section includes a d-q axis/three-phase converting section that converts the command voltages on d-q coordinate axes into three-phase command voltages, based on a first corrected detection angle obtained by adding a first amount of detection deviation, that corresponds to a time difference between a time point of angle detection by the angle detecting section and a time point when the brushless motor is driven by using the voltages at the levels indicated by the command values, to the detection angle.

A third invention according to the second or the third invention, provides the motor controller further includes a current detecting section that detects currents flowing through the brushless motor, wherein the drive controlling section includes a three-phase/d-q axis converting section that converts three-phase current detected values detected by the current detecting section into current detected values on the d-q coordinate axes, based on a second corrected detection angle obtained by adding or subtracting a second amount of detection deviation, that corresponds to a time difference between a time point of angle detection by the angle detecting section and a time point when the currents are detected by the current detecting section, to or from the detection angle.

A fourth invention provides an electronic power steering apparatus equipped with the motor controller set forth in any one of the first to third inventions.

ADVANTAGES OF THE INVENTION

According to the first invention, the command values are calculated based on the corrected detection angle that is obtained by adding or subtracting an amount of detection deviation, that corresponds to a time difference from a time point of angle detection by the angle detecting section, to or from the detection angle. Therefore, the influence of inconsistency in time such as a lag due to calculation times, a discrepancy of the detection timing from other detection values except the angle, a variation of control timing, or the like, for example, can be eliminated, and the motor control can be applied with good precision.

According to the second invention, the conversion is made based on the first corrected detection angle that is obtained by adding a first amount of detection deviation, that corresponds to a time difference between a time point of angle detection by the angle detecting section and a time point when the brushless motor is driven by using the voltages at the level indicated by the command values, to the detection angle. Therefore, the influence of the time difference (variation of control timing) can be eliminated, and the motor control can be applied with good precision.

According to the third invention, the conversion is made based on the second corrected detection angle that is obtained by adding or subtracting a second amount of detection deviation, that corresponds to a time difference between a time point of angle detection by the angle detecting section and a time point when the currents are detected by the current detecting section, to or from the detection angle. Therefore, the influence of the time difference (variation of control timing) can be eliminated, and the motor control can be applied with good precision.

According to the fourth invention, the motor can be driven with high precision. Therefore, a desired motor output can be obtained, and also the smooth steering assist can be provided.

Figure 1:
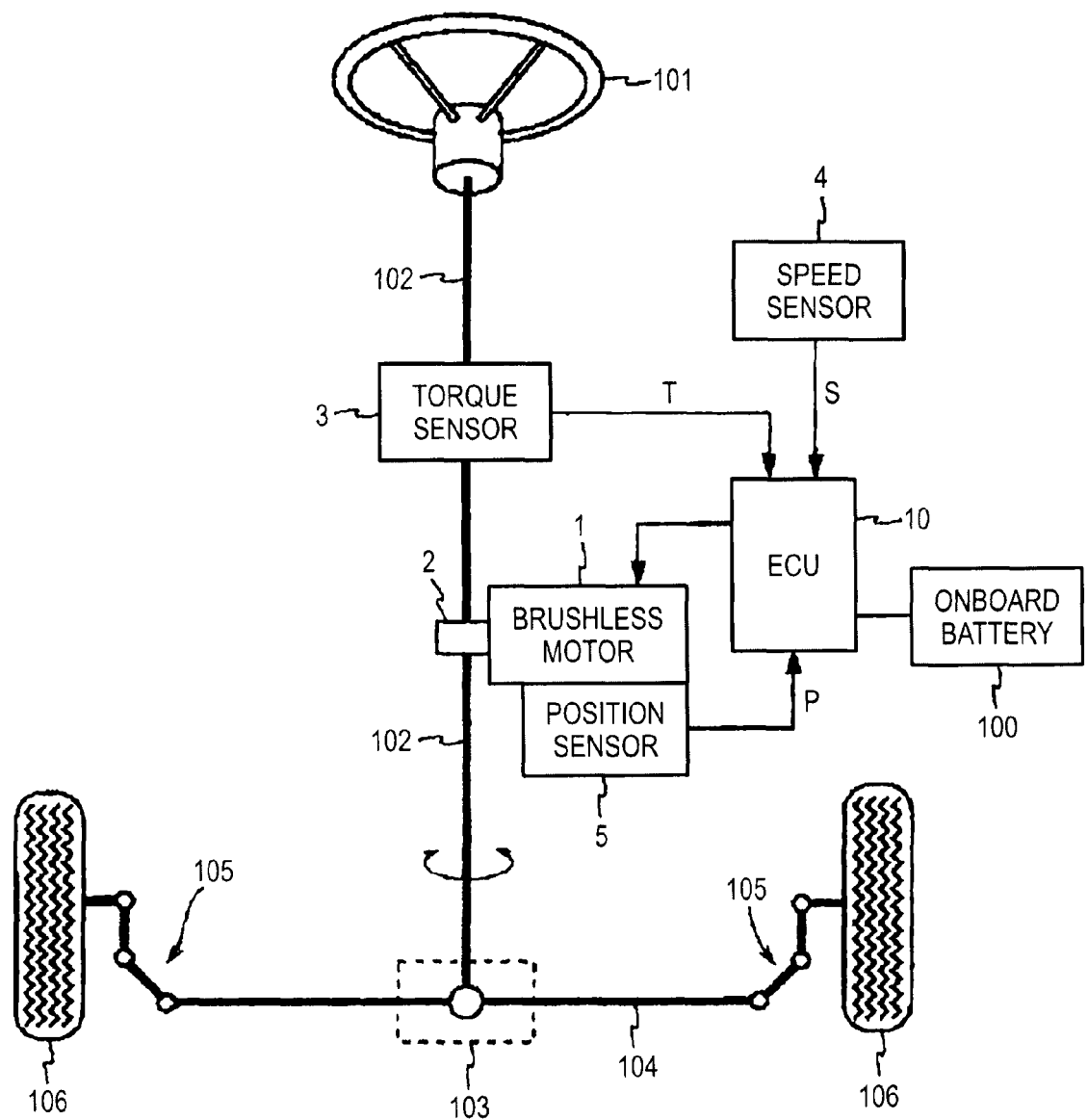
FIG. 1 A block diagram showing a configuration of an electronic power steering apparatus according to an embodiment of the present invention.

DESCRIPTION OF REFERENCE NUMERALS 10 electronic control unit (ECU), 13 motor driving circuit, 20 microcomputer.

BEST MODE FOR CARRYING OUT THE INVENTION

An embodiment of the present invention will be explained with reference to the accompanying drawings hereinafter.
<1. Overall Configuration of an Electronic Power Steering Apparatus>

FIG. 1 is a schematic block diagram showing a configuration of an electronic power steering apparatus according to an embodiment of the present invention, together with associated configurations of a vehicle. The electronic power steering apparatus shown in FIG. 1 is a column assist type electronic power steering apparatus that is equipped with a brushless motor 1, a reduction gear 2, a torque sensor 3, a speed sensor 4, a position sensor 5, and an electronic control unit (abbreviated as "ECU" hereinafter) 10.

As shown in FIG. 1, a steering wheel (handle) 101 is fixed to one end of a steering shaft 102, and the other end of the steering shaft 102 is coupled to a rack shaft 104 via a rack & pinion mechanism 103. Both ends of the rack shaft 104 are coupled to a wheel 106 via a coupling member 105 consisting of a tie-rod and a knuckle arm respectively. When a driver turns the steering wheel 101, the steering shaft 102 is turned and correspondingly the rack shaft 104 is moved reciprocally. The direction of the wheel 106 is changed according to a reciprocating motion of the rack shaft 104.

The electronic power steering apparatus executes the steering assist illustrated hereunder to reduce the load of the driver. The torque sensor 3 senses a steering torque T that is applied to the steering shaft 102 by the operation of the steering wheel 101. The speed sensor 4 senses a vehicle speed S. The position sensor 5 senses a rotation position P of the rotor of the brushless motor 1. The position sensor 5 is composed of the resolver, the Hall IC, or the like, for example.

The ECU 10 receives a supply of an electric power from an onboard battery 100, and drives the brushless motor 1 based on the steering torque T, the vehicle speed S, and the rotation position P. The brushless motor 1 when driven by the ECU 10 produces a steering assist force. The reduction gear 2 is provided between the brushless motor 1 and the steering shaft 102. The steering assist force produced by the brushless motor 1 is applied via the reduction gear 2 to turn the steering shaft 102.

As a result, the steering shaft 102 is turned by both the steering torque applied to the steering wheel 101 and the steering assist force produced by the brushless motor 1. In this manner, the electronic power steering apparatus performs the steering assist by applying the steering assist force produced by the brushless motor 1 to the steering mechanism of the vehicle.

The electronic power steering apparatus according to the embodiments of the present invention is characterized by the control device (motor controller) that drives the brushless motor 1. Therefore, the motor controller contained in the electronic power steering apparatus according to the embodiments will be explained hereunder.
<2. Overall Configuration of a Motor Controller>

Figure 2:
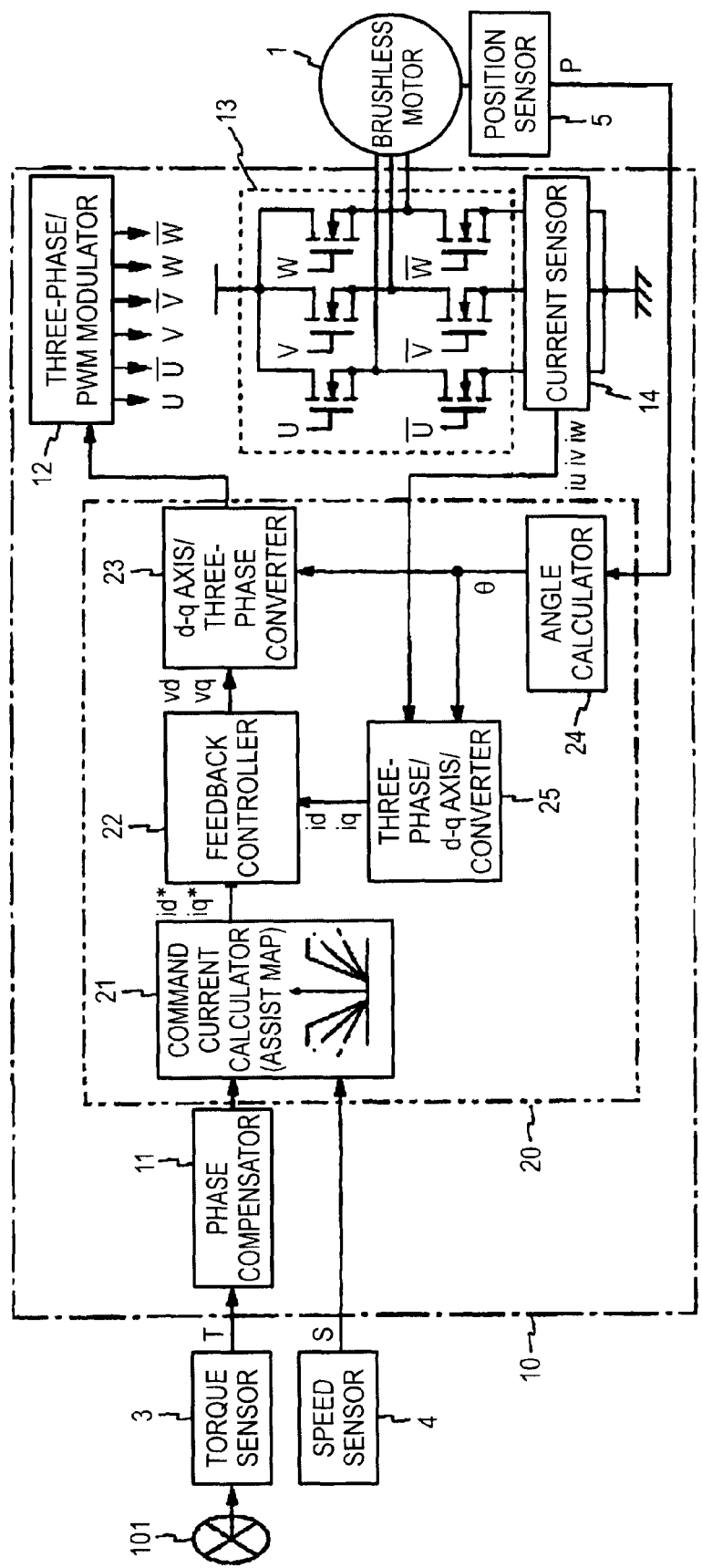
FIG. 2 A block diagram showing a configuration of a motor controller according to the above embodiment.

FIG. 2 is a block diagram showing a configuration of a motor controller according to one embodiment of the present invention. The motor controller shown in FIG. 2 is constructed by using the ECU 10, and drives the brushless motor 1 with three-phase windings (not shown) in u-phase, v-phase, and w-phase. The ECU 10 is equipped with a phase compensator 11, a microcomputer 20, a three-phase/PWM (Pulse Width Modulation) modulator 12, a motor driving circuit 13, and a current sensor 14.

The steering torque T output from the torque sensor 3, the vehicle speed S output from the speed sensor 4, and the rotation position P output from the position sensor 5 are input into the ECU 10. The phase compensator 11 applies a position compensation to the steering torque T. The microcomputer 20 functions as a controlling section for detecting a voltage command value used to drive the brushless motor 1. Details of functions of the microcomputer 20 will be described later.

The three-phase/PWM modulator 12 and the motor driving circuit 13 are constructed by hardware (circuit), and functions as a motor driving section for driving the brushless motor 1 by using a voltage at a level detected by the microcomputer 20. The three-phase/PWM modulator 12 receives the voltage signal corresponding to the duty ratio from the microcomputer 20 to produce three types of PWM signals (U, V, W shown in FIG. 2) that have a duty ratio to respond to the level of three-phase voltage detected by the microcomputer 20, and produces three types of PWM signals having such duty ratio. The motor driving circuit 13 is a PWM voltage type inverter circuit that contains six MOS-FETs (Metal Oxide Semiconductor Field Effect Transistors) as the switching elements. Six MOS-FETs are controlled by three types of PWM signals and their negative signals. When the conduction states of the MOS-FETs are controlled by using the PWM signals, three-phase driving currents (U-phase current, V-phase current, and W-phase current) are supplied to the brushless motor 1. In this manner, the motor driving circuit 13 has a plurality of switching elements, and functions as a switching circuit that supplies the currents to the brushless motor 1.

The current sensor 14 functions as a current detecting section for detecting the current being flowing through the brushless motor 1. The current sensor 14 is composed of a resistor or a Hall element, for example, and only one current sensor 14 is provided in respective phase, i.e., three current sensors 14 are provided in total, between the motor driving circuit 13 and a power supply. In an example shown in FIG. 2, the current sensor 14 is provided between the motor driving circuit 13 and the minus side (GND) of the power supply. But the current sensor 14 may be provided between the motor driving circuit 13 and the plus side of the power supply. Three-phase detected current values iu, iv, iw sensed by the current sensors 14 are input into the microcomputer 20.

When a program stored in a memory (not shown) built in the ECU 10 is executed, the microcomputer 20 functions as a command current calculator 21, a feedback controller 22, a d-q axis/three-phase converter 23, an angle calculator 24, and a three-phase/d-q axis converter 25. As discussed hereinafter, the microcomputer 20 derives a level of the voltage (referred to as a "command voltage" hereinafter) to be supplied to the motor driving circuit 13 such that a deviation between a command current value indicating a quality of current to be supplied to the brushless motor 1 and the detected current value of the brushless motor 1 becomes zero. Functions of respective portions that are implemented when this microcomputer 20 operates will be explained in detail hereunder.

<3. Operation of a Microcomputer>

Figure 3:
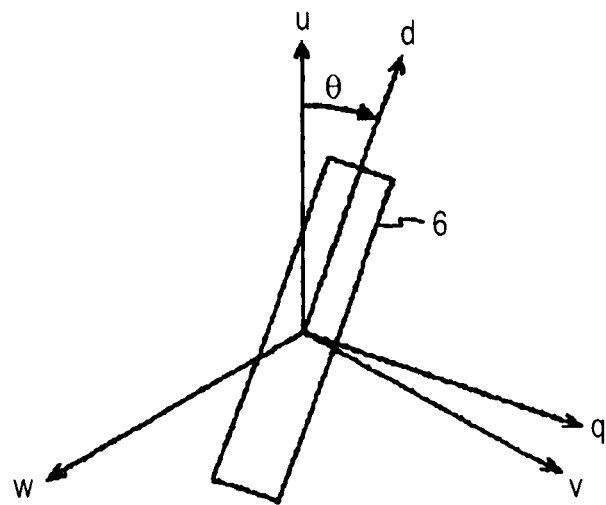
FIG. 3 A view showing three-phase AC coordinates and d-q coordinates in a three-phase brushless motor of the above embodiment.

The angle calculator 24 as a functional element contained in the microcomputer 20 calculates a rotation angle (referred to as an "angel θ" hereinafter) of the rotor of the brushless motor 1, based on the rotation position P that the position sensor 5 detects. In this case, as shown in FIG. 3, when a u-axis, a v-axis, and a w-axis are set to the brushless motor 1 and a d-axis and a q-axis are set to a rotor 6 of the brushless motor 1, an angle between the u-axis and the d-axis corresponds to the angel θ.

The three-phase/d-q axis converter 25 calculates a d-axis current detected value id and a q-axis current detected value iq on the d-q coordinate axes by using following equations (1) and (2), based on the current values iu, iv detected by the current sensors 14 on the three-phase AC coordinate axes and the angel θ calculated by the angle calculator 24.

$$id=\sqrt{2}\times\{iv\times\sin\theta c - iu\times\sin(\theta c - 2\pi/3)\} \quad (1)$$

$$iq=\sqrt{2}\times\{iv\times\cos\theta c - iu\times\cos(\theta c - 2\pi/3)\} \quad (2)$$

Figure 4:
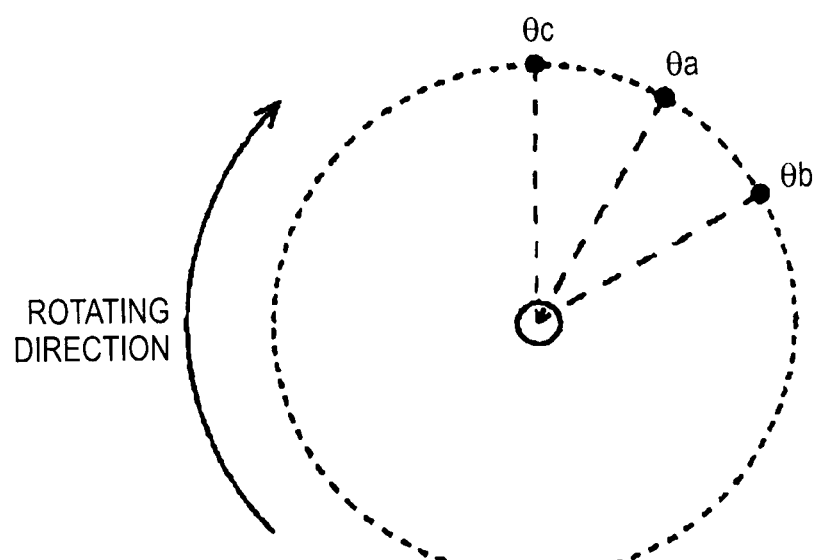
FIG. 4 A view showing a relationship between a detection angle of a rotor and a corrected detection angle in the three-phase brushless motor of the above embodiment.

Here, an angle θc contained in above equations (1) and (2) is different from the angel θ (represented as a detection angle θa hereinafter to discriminate from other angles) calculated by the angle calculator 24. As shown in FIG. 4, this angle θc is given as the angle that goes back from the detection angle θa by a predetermined angle in the opposite direction to the rotor rotating direction of the brushless motor 1, i.e., the angle that is earlier in time than the detection angle θa. A method of calculating this angle θc will be explained in detail hereinafter. In this event, an angle θb shown in FIG. 4 will be described later.

First, a relationship between the equations (1) and (2) represents a relationship between the detected current value and the detection angle at the same point of time. However, because there is a limit to the number of A/D converters built in the microcomputer 20, the microcomputer 20 may employ commonly one (or a set of plural) A/D converter in both uses of current detection and angle detection. In this case, the microcomputer 20 often acquires the current value that is subjected to the A/D conversion from the current sensors 14, and then acquires the detection angle θa that is subjected to the A/D conversion from the angle calculator 24. Accordingly, in such case, a time point tc of angle detection in the angle calculator 24, which should coincide with a time point of current detection in the current sensors 14, becomes earlier in time than an actual time point to of angle detection.

Therefore, in order to calculate the detection angle θc of the angle calculator 24, which is located at an earlier time point by a time difference T1 (=tc~ta), from the detection angle θa at the present time, the angle θc can be expressed by a following equation (3) on the assumption that a rotation angular velocity ω of the brushless motor 1 is kept substantially constant from the time point tc to the time point ta.

$$\theta c = \theta a - T1 \times \omega \quad (3)$$

Also, the similar consideration can be applied even when the current detection and the angle detection are executed in the opposite order to the above, i.e., the microcomputer 20 acquires the detection angle θa that is subjected to the A/D conversion from the angle calculator 24, and then acquires the current value that is subjected to the A/D conversion from the current sensors 14. In this case, unlike the case shown in FIG. 4, a time point tc' of angle detection in the angle calculator 24, which should coincide with a time point of current detection in the current sensors 14, becomes later in time than an actual time point ta of angle detection. Therefore, in order to calculate the detection angle θc of the angle calculator 24, which is located at a later time point by a time difference T1 (=ta~tc'), from the detection angle θa at the present time, the angle θc can be expressed by a following equation (3)' on the assumption that a rotation angular velocity ω of the brushless motor 1 is kept substantially constant from the time point ta to the time point tc'.

$$\theta c = \theta a + T1 \times \omega \quad (3)'$$

Here, the angular velocity ω can be obtained by differentiating the detection angle in the angle calculator 24. Also, for example, a difference between a stored value of the detection angle being stored earlier by a predetermined time and the detection angle may be calculated, and then a predetermined value corresponding to the calculated value may be employed as a value corresponding to the angular velocity ω.

As described above, the three-phase/d-q axis converter 25 adds or subtracts an amount of detection deviation T1×ω, which corresponds to a time difference between a time point of angle detection and a time point of current detection in the current sensors 14, to or from the detection angle θa calculated by the angle calculator 24, and then converts the current values iu, iv, iw detected by the current sensors 14 on the three-phase AC coordinate axes into the d-axis detected current id and the q-axis detected current iq on the d-q coordinate axes, based on the resultant corrected detection angle θc. The converted d-axis detected current id and the converted q-axis detected current iq are fed to the feedback controller 22.

The command current calculator 21 calculates a d-axis current and a q-axis current to be supplied to the brushless motor 1 (the former is referred to as a "d-axis command current id*" hereinafter, and the latter is referred to as a "q-axis command current iq*" hereinafter), based on the steering torque T after the phase compensation (output signal of the phase compensator 11) and the velocity speed S. In more detail, the command current calculator 21 has a built-in table in which correspondences between the steering torque T and the command current are stored using the vehicle speed S as a parameter (referred to as an "assist map" hereinafter), and calculates the command current by referring to an assist map. When the steering torque is given at some magnitude, the d-axis command current id* and the q-axis command current iq*, which are supplied to the brushless motor 1 to produce the steering assist force having an adequate magnitude in response to a magnitude of the steering torque, can be detected by using the assist map. The detected d-axis command current id* and the detected q-axis command current iq* are fed to the feedback controller 22.

In this case, the q-axis command current iq* calculated by the command current calculator 21 is a current value with sign, and the sign indicates the direction of the steering assist. For example, the steering assist is applied to turn rightward when the sign is plus, and the steering assist is applied to turn leftward when the sign is minus. Also, typically the d-axis command current id* is set to zero.

The feedback controller 22 applies the well-known proportional integral operation to the current variations such that the current variation between the d-axis command current id* and the d-axis detected current id and the current variation between the q-axis command current iq* and the q-axis detected current iq become zero respectively, and thus calculates a d-axis voltage and a q-axis voltage, which are supplied to the brushless motor 1 (the former is referred to as a "d-axis command voltage vd" hereinafter, and the latter is referred to as a "q-axis command voltage vq" hereinafter).

In fact, commonly the d-axis detected current id is often controlled to zero because this current does not contribute to a generation of the motor torque. However, when the so-called flux-weakening control (field-weakening control) is applied, the d-axis detected current id is controlled to flow.

The d-q axis/three-phase converter 23 converts the d-axis command voltage vd and the q-axis command voltage vq calculated by the feedback controller 22 into the command voltages on the three-phase AC coordinate axis. In more detail, the d-q axis/three-phase converter 23 calculates a u-phase command voltage Vu, a v-phase command voltage Vv, and a w-phase command voltage Vw by using following equations (4) to (6), based on the d-axis command voltage vd and the q-axis command voltage vq.

$$Vu=\sqrt{(2/3)} \times \{vd \times \cos\theta b - vq \times \sin\theta b\} \quad (4)$$

$$Vv=\sqrt{(2/3)} \times \{vd \times \cos(\theta b - 2\pi/3) - vq \times \sin(\theta b - 2\pi/3)\} \quad (5)$$

$$Vw=-Vu-Vv \quad (6)$$

Here, an angle θb contained in above equations (4) and (5) is different from the detected angel θa calculated by the angle calculator 24. As shown in FIG. 4, this angle θb is given as the angle that goes to the detection angle θa by a predetermined angle in the rotor rotating direction of the brushless motor 1, i.e., the angle that is later in time than the detection angle θa. A method of calculating this angle θb will be explained in detail hereinafter.

First, a relationship between the equations (4) and (5) represents a relationship between the command voltage and the detection angle at the same point of time. In this case, the command voltage indicates a duty ratio of the PWM signal that is to be output from the three-phase/PWM modulator 12. Hence, it is possible to say that the point of time when the electric current responding to this PWM signal flows through the three-phase windings of the brushless motor 1 and the rotor of the brushless motor 1 is rotated corresponds to the point of time when the control should be applied by using the command voltages. Accordingly, a time point tb of angle detection in the angle calculator 24, which should coincide with a time point when the control should be applied by using the command voltages, becomes later in time than an actual time point ta of angle detection.

Therefore, in order to calculate the detection angle θb of the angle calculator 24, which is located at a later time point by a time difference T2 (=ta~tb), from the detection angle θa at the present time, the angle θb can be expressed by a following equation (7) on the assumption that the rotation angular velocity ω of the brushless motor 1 is kept substantially constant from the time point ta to the time point tb.

$$\theta b = \theta a + T2 \times \omega \quad (7)$$

Here, it is described above that the angular velocity ω can be obtained by differentiating the detection angle in the angle calculator 24.

Concretely, the time point that is subsequent to the time point when the voltage is applied to the brushless motor 1 from the motor driving circuit 13, e.g., a time point when the next current value is acquired from the current sensor 14 or a time point that is just before the time point when the next current value is acquired, or the like, is preferable as the time point when the control should be applied by using the command voltages (i.e., the time point tb of angle detection).

As described above, the d-q axis/three-phase converter 23 adds an amount of detection deviation T2×ω, which corresponds to a time difference between a time point of angle detection by the angle calculator 24 and a time point when the brushless motor 1 is driven by using the voltage at the level indicated by the command value, to the detection angle θa calculated by the angle calculator 24, and converts the d-axis command voltage vd and the q-axis command voltage vq into the u-phase command voltage Vu, the v-phase command voltage Vv, and the w-phase command voltage Vw based on the corrected detection angle θb that is obtained as the added result. The converted u-phase command voltage Vu, the converted v-phase command voltage Vv, and the converted w-phase command voltage Vw are output to the three-phase/PWM modulator 12 as the voltage signal that indicates a duty ratio of the PWM signal to be output from the three-phase/PWM modulator 12, based on the power supply voltage that is detected by the power supply (here, the battery) voltage detector (not shown).

In this manner, the microcomputer 20 functions as a motor drive controlling section that executes a process of calculating the command currents id*, iq* on the d-q coordinate axes, a process of converting the three-phase detected current values iu, iv, iw into the detected currents id, iq on the d-q coordinate axes, a process of calculating the command voltages vd, vq on the d-q coordinate axes, and a process of converting the command voltages vd, vq on the d-q coordinate axes into the three-phase command voltages Vu, Vv, Vw.

The three-phase/PWM modulator 12 outputs three types of PWM signals based on the voltage signal indicating a duty ratio in response to the three-phase command voltages Vu, Vv, Vw given by the microcomputer 20. Accordingly, the sine-wave currents responding to the command voltages in respective phases flow through the three-phase windings of the brushless motor 1, and the rotor of the brushless motor 1 is rotated. A torque that responds to the currents that flow through the brushless motor 1 is generated by the rotation shaft of the brushless motor 1. The generated torque is employed in the steering assist.

<4. Advantages>

As described above, in the motor controller according to the present embodiment, the three-phase/d-q axis converter 25 executes the conversion based on the corrected detection angle θc that is obtained by adding or subtracting an amount of detection deviation, which corresponds to a time difference from a time point of current detection, to or from the detection angle θa calculated by the angle calculator 24, and also the d-q axis/three-phase converter 23 executes the conversion based on the corrected detection angle θb that is obtained by adding an amount of detection deviation, which corresponds to a time difference from a time point when the brushless motor 1 is driven, to the detection angle θa.

As a result, according to the motor controller according to the present embodiment, the influence of inconsistency in time such as a lag due to calculation times, a discrepancy of the detection timing from other detection values except the angle, a variation of control timing, or the like can be eliminated by correcting the angle detected by the motor rotation angle detecting section, and the motor control can be applied with good precision.

Also, according to the electronic power steering apparatus equipped with this motor controller, the motor can be driven with high precision. Therefore, a desired motor output can be obtained, and also the smooth steering assist can be provided.

<5. Variation>

In the present embodiment, the configuration in which the feedback control is applied by the feedback controller 22 is employed, but the configuration in which the well-known open-loop control is applied may be employed instead of the above configuration. In this open-loop control, the d-axis command voltage vd and the q-axis command voltage vq are calculated by using following equations (8) and (9).

$$vd=(R+PLd)id^* - \omega eLqiq^* \quad (8)$$

$$vq(R+PLq)iq^* + \omega eLdid^* + \omega e\Phi \quad (9)$$

Where, in the equations (8) and (9), ωe is the angular velocity of the rotor, R is the circuit resistance containing the armature winding resistance, Ld is the d-axis self-inductance, Lq is the q-axis self-inductance, Φ is the √(2/3) multiple of the maximum value of the armature winding flux linkage number in U, V, W phases, and P is the differential operator P. Out of them, R, Ld, Lq, and Φ are handled as the already-known parameters.

In this manner, when the open-loop control is applied, the angular velocity of the rotor is required for the control. Therefore, when this angular velocity is derived by differentiating the detection angle θa calculated by the angle calculator 24, the angular velocity may be calculated based on the corrected detection angle θc that is obtained by correcting the detection angle θa by the angle calculator 24, like the case in the three-phase/d-q axis converter 25. In this case, the above-mentioned corrected detection angle may be calculated by taking further a time required for the differentiating operation into a consideration. Also, even when a sensor for detecting directly the angular velocity, or the like is provided, the similar consideration to the above can be applied.

Also, when the flux-weakening control (field-weakening control) is applied even in not only a situation that the open-loop control is applied but also a situation that the feedback control in the present embodiment is applied, the d-axis command voltage vd is calculated by using above equation (8), and thus the angular velocity is similarly employed. Accordingly, in this case, the angular velocity may also be calculated based on the corrected detection angle θc that is obtained by correcting the detection angle θa by the angle calculator 24, like the case in the three-phase/d-q axis converter 25.

Further, when various operations are executed for the purpose of well-known controls using the detection angle θa (or the angular velocity as its derivative or the angular acceleration as its second derivative) calculated by the angle calculator 24, the angular velocity may be calculated, based on the corrected detection angle θc that is obtained by correcting the detection angle θa by the angle calculator 24, like the case in the three-phase/d-q axis converter 25 or the d-q axis/three-phase converter 23 (or while further considering the calculation time, or the like into a consideration).

The invention claimed is:

1. A motor controller for driving a brushless motor, comprising:
   an angle detecting section that detects a rotation angle of a rotor of the brushless motor;
   a drive controlling section that calculates command values indicating levels of command voltages for driving the brushless motor;
   a motor driving section that drives the brushless motor by using the voltages at the levels indicated by the command values calculated by the drive controlling section; and
   a current detecting section that detects currents flowing through the brushless motor,
   wherein the drive controlling section calculates the command value, based on a corrected detection angle obtained by adding or subtracting an amount of detection deviation, that corresponds to a time difference from a time point of angle detection by the angle detecting section, to or from an angle detected by the angle detecting section;
   wherein the drive controlling section includes a d-q axis/three-phase converting section that converts the command voltages on d-q coordinate axes into three-phase command voltages, based on a first corrected detection angle obtained by adding a first amount of detection deviation, that corresponds to a time difference between the time point of angle detection by the angle detecting section and a time point when the brushless motor is driven by using the voltages at the levels indicated by the command values, to the detection angles; and
   wherein the time point of the angle detection by the angle detecting section is subsequent to a time point when the voltages are applied to the brushless motor by the motor driving section, and is a time point when next current values are acquired from the current detecting section or a time point just before the time point when next current values are acquired from the current detecting section.

2. The motor controller according to claim 1, wherein the drive controlling section includes a three-phase/d-q axis converting section that converts three-phase current detected values detected by the current detecting section into current detected values on the d-q coordinate axes, based on a second corrected detection angle obtained by adding or subtracting a second amount of detection deviation, that corresponds to a time difference between the time point of angle detection by the angle detecting section and a time point when the currents are detected by the current detecting section, to or from the detection angle.

3. The motor controller according to claim 1, wherein the drive controlling section performs an open-loop control.

4. An electronic power steering apparatus including a motor controller for driving a brushless motor, wherein the motor controller includes:
   an angle detecting section that detects a rotation angle of a rotor of the brushless motor;
   a drive controlling section that calculates command values indicating levels of command voltages for driving the brushless motor;
   a motor driving section that drives the brushless motor by using the voltages at the levels indicated by the command values calculated by the drive controlling section; and
   a current detecting section that detects currents flowing through the brushless motor;
   wherein the drive controlling section calculates the command value, based on a corrected detection angle obtained by adding or subtracting an amount of detection deviation, that corresponds to a time difference from a time point of angle detection by the angle detecting section, to or from an angle detected by the angle detecting section;

wherein the drive controlling section includes a d-q axis/three-phase converting section that converts the command voltages on d-q coordinate axes into three-phase command voltages, based on a first corrected detection angle obtained by adding a first amount of detection deviation, that corresponds to a time difference between the time point of angle detection by the angle detecting section and a time point when the brushless motor is driven by using the voltages at the levels indicated by the command values, to the detection angle; and wherein the time point of the angle detection by the angle detecting section is subsequent to a time point when the voltages are applied to the brushless motor by the motor driving section, and is a time point when next current values are acquired from the current detecting section or a time point just before the time point when next current values are acquired from the current detecting section.

5. The electronic power steering apparatus according to claim 4, wherein the drive controlling section includes a three-phase/d-q axis converting section that converts three-phase current detected values detected by the current detecting section into current detected values on the d-q coordinate axes, based on a second corrected detection angle obtained by adding or subtracting a second amount of detection deviation, that corresponds to the time difference between a time point of angle detection by the angle detecting section and a time point when the currents are detected by the current detecting section, to or from the detection angle.

6. The electronic power steering apparatus according to claim 4, wherein the drive controlling section performs an open-loop control.

* * * * *